Patented Apr. 5, 1927.

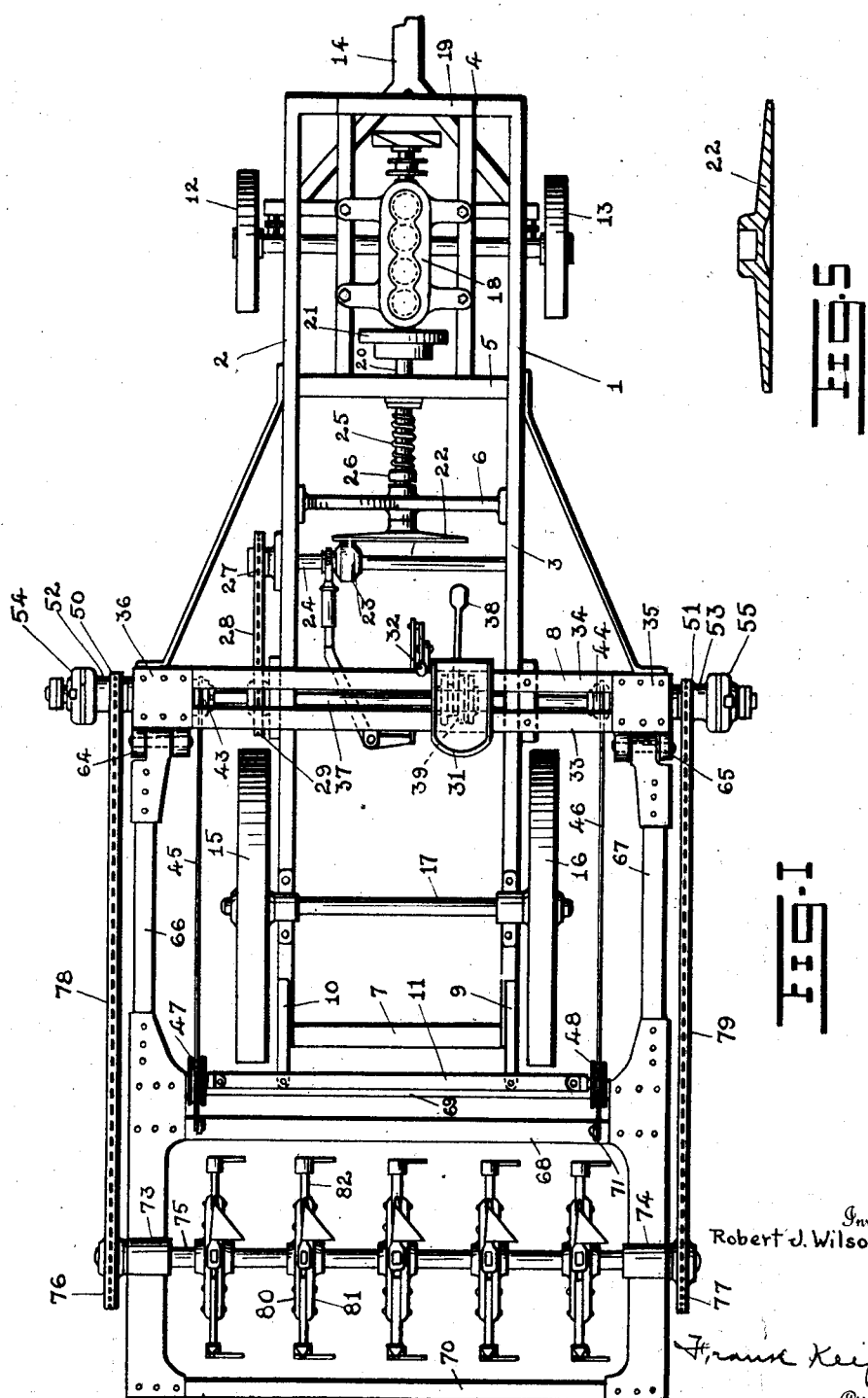

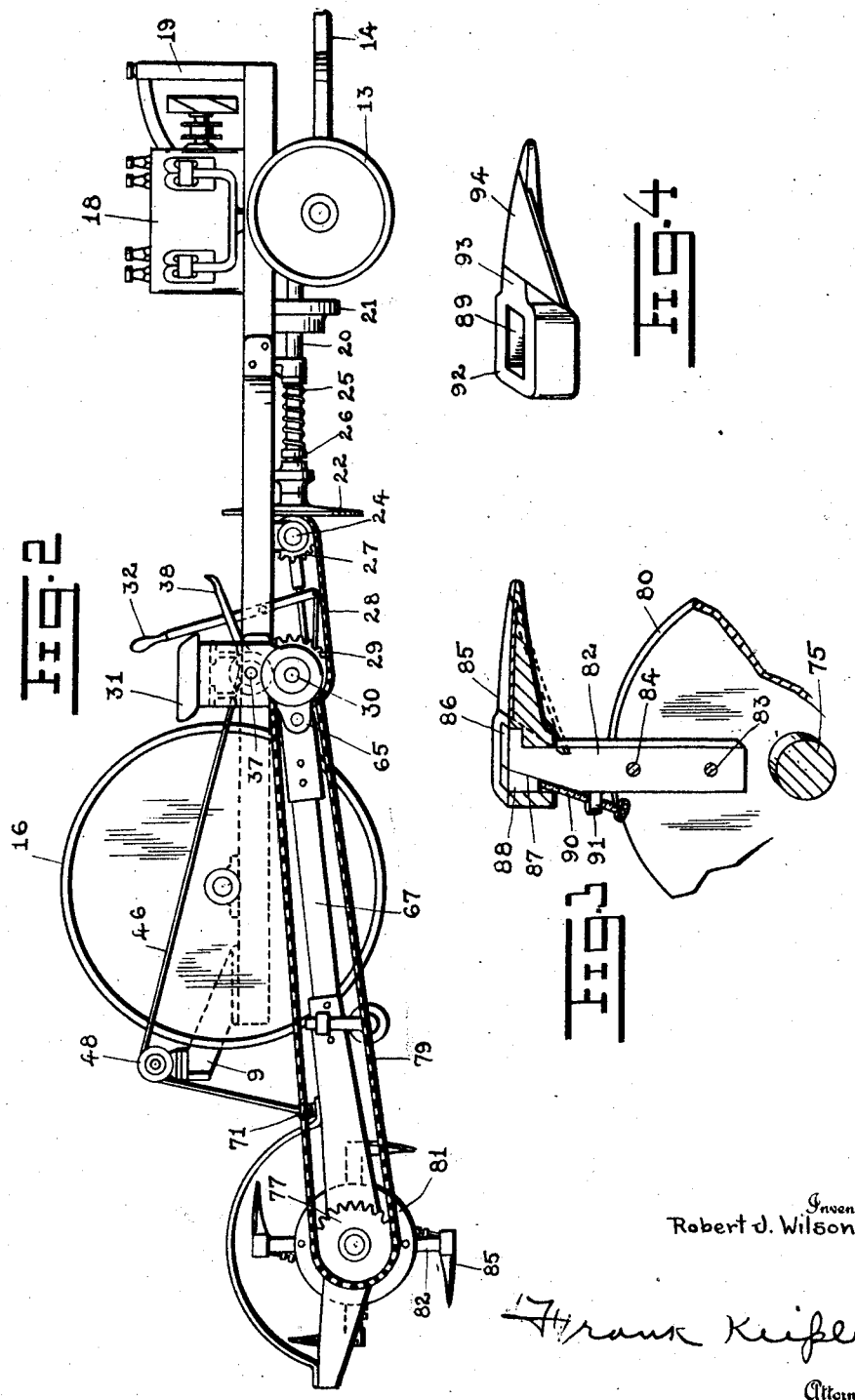

1,623,149

UNITED STATES PATENT OFFICE.

ROBERT J. WILSON, OF ROCHESTER, NEW YORK, ASSIGNOR OF ONE-HALF TO ROBERT S. CRAIN, OF BUFFALO, NEW YORK.

ROTARY GANG PLOW.

Application filed November 27, 1925. Serial No. 71,825.

The object of this invention is to provide a new and improved form of a rotary gang plow. Another object of the invention is to provide a machine by which the plows are rotated by engine power while the machine is drawn forward by horses.

Another object of the invention is to provide a new and improved form of power transmission between the engine and the rotating gang plow.

Another object is to provide for the lifting of the plow so as to avoid obstacles and otherwise protect against serious damage that might be caused by collision with obstacles. These and other objects of the invention will be fully illustrated in the drawing, described in the specification and pointed out in the claims at the end thereof.

In the drawings:

Figure 1 is a top plan view of the plow.

Figure 2 is a side elevation thereof.

Figure 3 is a detailed perspective view of one of the plow shares and the method of mounting it, the share being shown in section.

Figure 4 is a perspective detail view of one of the plow shares.

Figure 5 is a horizontal section through the disk 22.

In the drawings, like reference numerals indicate like parts.

In the drawing reference numeral 1 indicates the frame of the machine which is made of metal preferably channel iron or angle iron. 2 and 3 indicate the sills which are connected together by suitable cross bars 4, 5, 6 and 7 which are just long enough to connect the sills. A little back of the center of the frame is placed a long cross bar 8 which extends outside of the frame on either side. At the rear end of the frame are placed the brackets 9 and 10 which extend upwardly and rearwardly and support the cross bar 11 which extends outside of the frame on either side. At the forward end is provided the wheels 12 and 13 with an axle therefor and a tongue 14 extending forward form the axle. At the rear is provided the wheels 15 and 16 and the axle 17 therefor.

On the front end of the frame is mounted the internal combustion engine 18 by which the gang plow is rotated. In front of this is provided the radiator 19 by which the engine is kept cool. From the engine leads back the power shaft 20 having a fly wheel 21 thereon. On the shaft 20 a friction disk 22 is provided which makes contact with the friction pinion 23 by which power is transmitted to the jack shaft 24. A spring 25 is placed around the shaft 20 and presses on a collar 26 which is pinned to the shaft by which the disk 22 is held in contact with the friction pinion 23. The shaft 24 is provided with suitable bearings on the sills 2 and 3. On the end of the shaft 24 is provided a sprocket wheel 27 which drives a chain 28 which in turn drives a sprocket wheel 29 on the shaft 30. The shaft 30 is mounted to rotate in suitable bearings provided on the cross bar 8.

The cross bar 8 is made up of two parallel I beams 33 and 34 that are fastened to the sills 2 and 3 and extend out beyond them on each side thereof. On the ends of these I beams are provided the brackets 35 and 36 which brackets extend down below the I beams. In these brackets the shaft 30 is mounted to rotate below the sills 2 and 3.

The short shaft 37 is mounted to rotate in the sills above the shaft 30 and parallel thereto. Above the I beams 33 and 34 is provided the driver's seat 31. Suitably mounted on the frame is the lever 32 connected by links to the friction pinion 23 by which it may be moved from central position and out therefrom to vary the speed at which it will be driven. The disk 22 is hollowed out at the center so that when the pinion 23 is placed in central position it will not make contact with the disk 22, and will therefore not be driven but will stand idle. This permits the starting of the engine free from load after which the load can be placed thereon by shifting the pinion 23 for which purpose the lever 32 and connecting links are provided.

Below the driver's seat is mounted the foot pedal or lever 38 by which a friction drive is operated as follows: Splined on the shaft 37 is a friction disk 39 which is moved sidewise by the throwing of the pedal 38 which disk then comes into contact with another disk keyed on the shaft 30, both of which disks are located substantially below the driver's seat. When these disks are brought together the lower shaft causes the upper shaft 37 to rotate through the disks. On the ends of the shaft 37 are provided suitable drums 43 and 44 which rotate therewith and to which are fastened cables 45 and 46. These cables pass back over pulleys 47 and 48 carried on the brackets 9 and 10 and down therefrom and are adapted to lift the swinging frame which carries the rotating gang plow that will presently be described.

Near the outer ends of the shaft 30 are provided the sprocket wheels 50 and 51 which rotate therewith as the shaft is driven by the sprocket wheel 29. These sprocket wheels are carried on sleeves 52 and 53 which are provided with disks which make frictional contact with clutch members 54 and 55 which are keyed to the shaft so as to rotate therewith. Ordinarily all parts rotate together, but if an extra heavy load is thrown on the plows which prevents them from rotating, such as striking an obstruction as a stone, stump, etc., these friction clutches will slip and save the mechanism from breaking. Otherwise the frictional contact is sufficient to secure positive driving.

As above described the brackets 35 and 36 contain the bearings in which the shaft 30 is supported and rotates. These brackets also are provided with lugs 64 and 65 in which are pivotally mounted the sills 66 and 67 of the swinging frame which supports the gang plow. These sills are connected together by the angle irons 68 and 69, forward of the plow, and are connected together by the angle iron 70 behind the plow. To the angle iron 68 is connected suitable eyebolts 71 to which the cables 45 and 46 are connected by which the frame is lifted. In the frame are provided suitable bearings 73 and 74 in which is journaled the shaft 75 which is driven by the sprocket wheels 76 and 77 which in turn are driven by the sprocket chains 78 and 79 from the sprocket wheels 50 and 51.

On the shaft 75 are keyed in pairs the disks 80 and 81 between which the standards 82, 82 are fastened. These standards are fastened by a metal bolt or rivet 83 and a wooden pin 84 so that in case the share strikes some obstruction in the ground that might break the machinery the wooden pin 84 can break and release the standard 82 which can swing on the bolt 83.

On the outer end of the standard 82 is fastened the share 85. As shown in Figure 3 the forward end of the standard is provided with a lug or shoulder 86 and the standard is beveled at the rear end as shown at 87, the bevel being filled up by the wedge 88. The share is provided with a hub 92 having a socket 89 therein that will receive the shouldered end of the standard 82. After the share is in place the wedge 88 is inserted and is drawn down by the screw 90 which is threaded in the lug 91. In this way the share is rigidly fastened in place on the standard 82 and cannot work loose. The share comprises the hub 92 and the shank 93 extending forwardly therefrom to a point on top of which, as shown in Figures 3 and 4, is provided a blade 94 which is welded or riveted to the shank.

As shown in Figure 2 four of these standards and shares are provided between each pair of disks and as shown in Figure 1 five pairs of disks are assembled on the shaft 75 all of which rotate together and are driven by power from the engine 18 for the purpose of digging up the ground as the plow is drawn forward by the horses. This machine is intended to plow a furrow about five feet wide at the rate of two miles or more per hour.

I claim:

1. In a rotary gang plow the combination of a shaft, a pair of disks fastened to said shaft, standards fastened radially between said disks and extending outwardly therefrom, shares fastened to said sandards, each of said shares comprising a head having an opening therein, a tooth projecting from one side of said head, and a horizontal cutting blade projecting from the side of said tooth.

2. In a rotary gang plow having a series of shares, each of said shares comprising a head having an opening therein, a tapered and pointed tooth projecting laterally from said head, a flat cutting blade projecting from one side of said tooth, and an angular cutting edge at the front of said cutting blade.

3. In a rotary gang plow, the combination of a shaft, a pair of disks carried on said shaft, standards fastened to said disks and extending outwardly therefrom, shares carried on the outer end of said standards, each of said standards comprising a head having an opening therein, a recess in the top of said head and leading from the opening therein, an overhanging lug provided on the outer end of said standard and adapted to engage into said recess, means for clamping said standard into the opening of said head and said lug into said recess to hold said share in place on the end of said standard.

4. In a gang plow, the combination of a standard having at one end a shoulder on one side and a bevel on the other side, a share having a socket to receive the standard and a recess to receive the shoulder so as to interlock therewith, a wedge bearing on the bevel and filling the opening in the socket, a screw mounted on the standard and connected to the wedge to draw the wedge down in the socket to lock the share on the standard.

In testimony whereof I affix my signature.

ROBERT J. WILSON.